Nov. 18, 1924.  
J. SCHUBNEL  
1,516,213  
COMBINED EMERGENCY BRAKE AND JACK  
Filed Nov. 22, 1921  
3 Sheets-Sheet 3
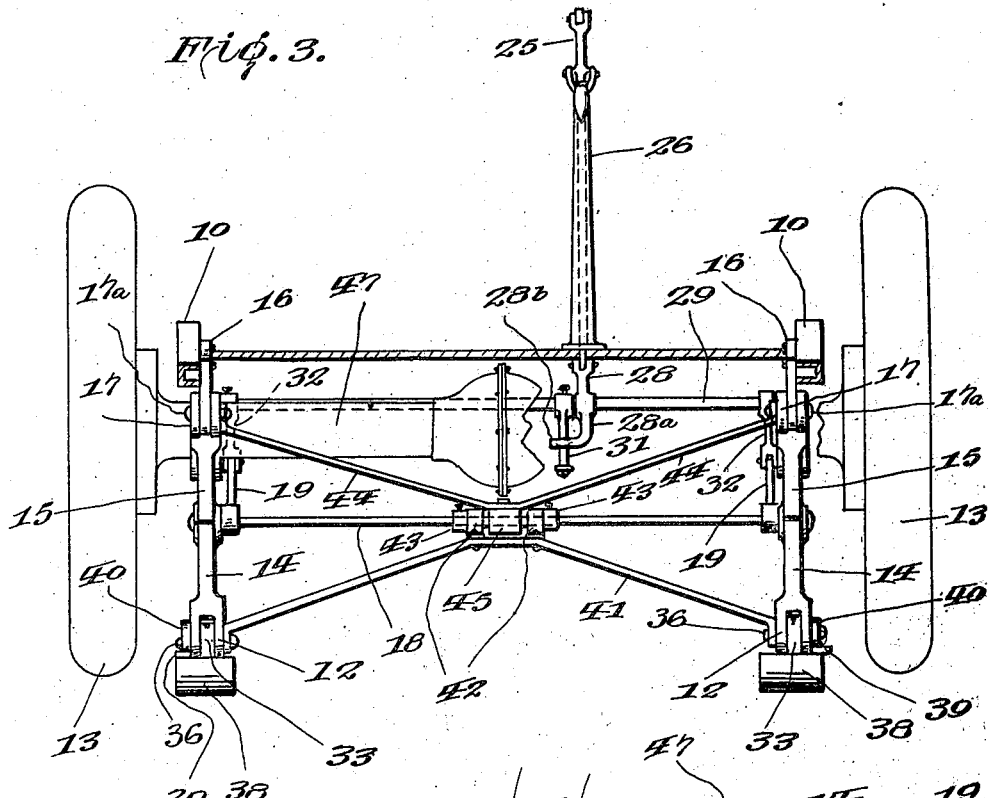
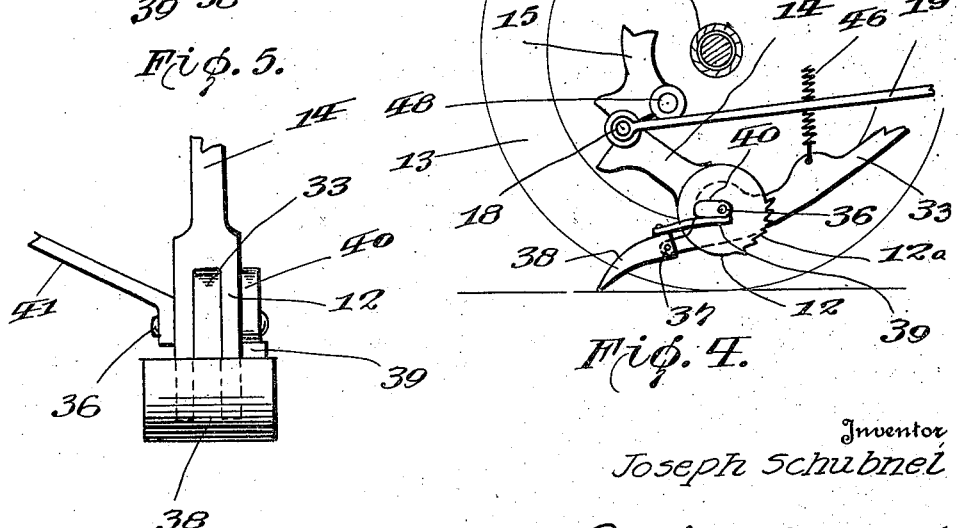
Inventor  
Joseph Schubnel  
By Milo B. Stevens & Co  
Attorney.

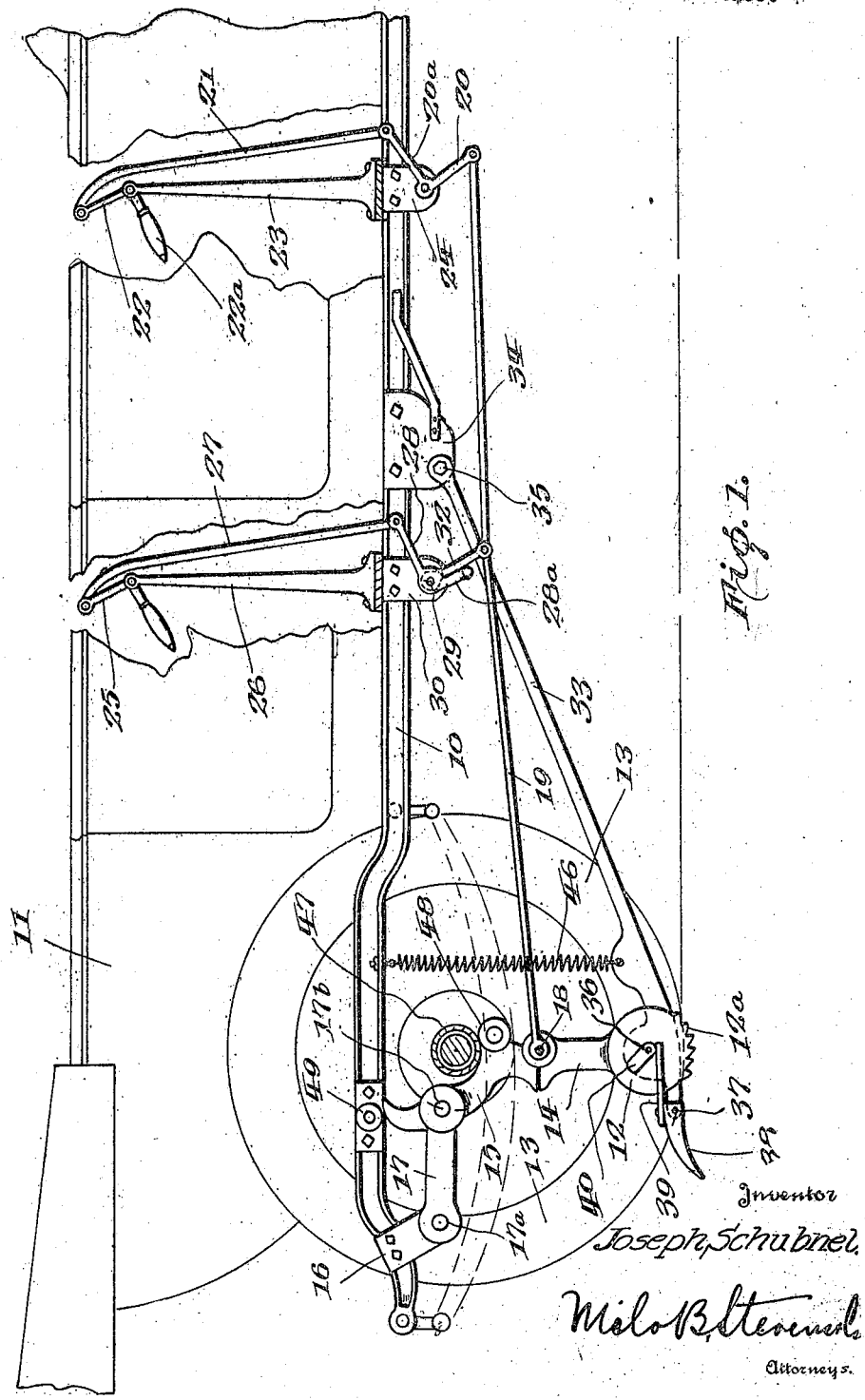

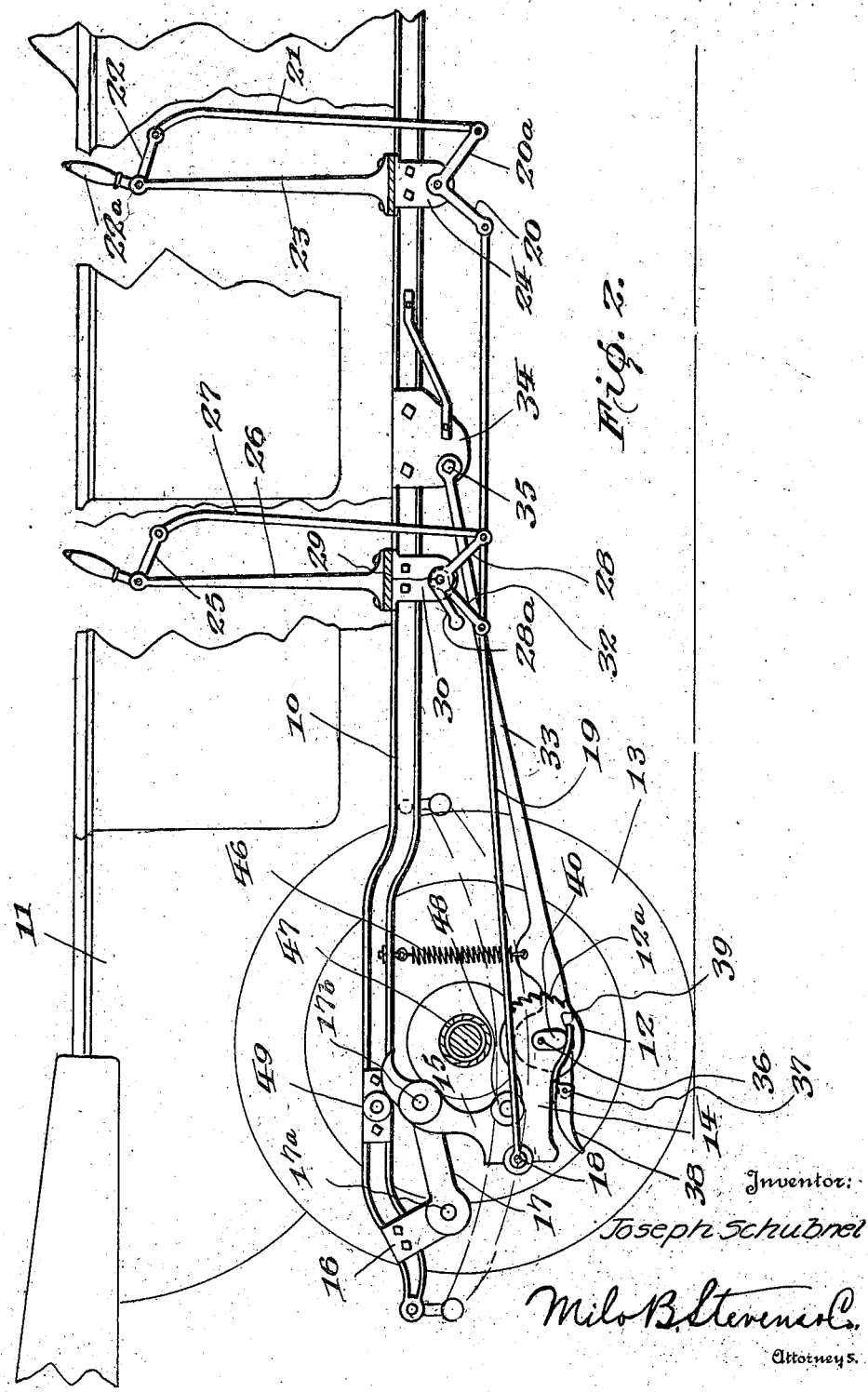

Patented Nov. 18, 1924.

1,516,213

UNITED STATES PATENT OFFICE.

JOSEPH SCHUBNEL, OF NORTH ADAMS, MASSACHUSETTS.

COMBINED EMERGENCY BRAKE AND JACK.

Application filed November 22, 1921. Serial No. 517,093.

*To all whom it may concern:*

Be it known that I, JOSEPH SCHUBNEL, a citizen of France, residing at North Adams, in the county of Berkshire and State of Massachusetts, have invented new and useful Improvements in Combined Emergency Brakes and Jacks, of which the following is a specification.

This invention relates to brakes for automobiles and other vehicles which operate by a direct engagement with the ground, and its object is to provide a very efficient and reliable brake mechanism of this kind, and also to provide a sprag which can be set when necessary for holding the car on a steep grade.

The objects stated are attained by means of a novel combination and arrangement of parts to be hereinafter described and claimed, and in order that the same may be better understood, reference is had to the accompanying drawing, wherein:

Figure 1 is a side elevation of the mechanism, the brake being shown in operative position; Fig. 2 is a similar view showing the brake in inoperative position; Fig. 3 is an end view; Fig. 4 is an elevation illustrating the operation of the sprag, and Fig. 5 is an enlarged rear elevation of the sprag.

Referring specifically to the drawings, 10 denotes the side bars of a motor-vehicle chassis, and at 11 is shown a fragment of the vehicle body. The brake which is the subject matter of the present application for patent consists of a pair of ground-engaging, cam-like members 12 positioned between the hind wheels 13 of the car alongside the same, one of said members being adjacent to one wheel, and the other member being adjacent to the other wheel, as shown in Fig. 3. The two brake members are connected for simultaneous operation, and each one is on the outer end of a link or arm 14 having a pivotal connection with a link member 15. On the side bars 10 are brackets 16 carrying links 17 which are connected to the members 15, said links being pivoted at one end to the brackets 16, as shown at 17$^a$, and at their other ends to the members 15, as shown at 17$^b$. The pivotal connection between the links 14 and 15 is made by a cross rod 18, said rod also forming the connection between the two brake members. The parts 14 and 15 form a toggle and when the two arms thereof are straightened out as shown in Fig. 1, the cam member 12 at the outer end of the arm 14 is brought downwardly to come in contact with the ground, whereas when the two arms are folded or swung toward each other, as shown in Fig. 2, the cam member 12 is elevated and carried to non-operative position. In order to obtain a better hold on the ground, the cam member 12 is toothed, as shown at 12$^a$.

The toggle is operated in the manner described by a connecting rod 19, said rod being attached at one end to the rod 18, and extending forwardly therefrom, its forward end being connected to one branch 20 of an angle lever having its other branch 20$^a$ connected by a link 21 to an actuator lever 22 provided with a hand grip 22$^a$, said lever being located in the front compartment of the car so as to be within easy reach of the driver. A post 23 rising from the floor of the car supports the lever 22, and a bracket 24 secured to the frame side bar 10 supports the angle lever composed of the parts 20 and 20$^a$.

A means is also provided for operating the rod 19 from the rear compartment of the car. In this compartment is a hand lever 25 supported by a standard 26 and connected by a link 27 to one arm 28 of an angle lever loose on a shaft 29 extending between and supported by brackets 30 on the side bars 10. The other arm 28$^a$ of the angle lever just described has a laterally extending finger 28$^b$ (Fig. 3) which is behind a rocker arm 31 fast on shaft 29. It will therefore be seen that when the hand lever 25 is swung downwardly from the position shown in Fig. 2 to the position shown in Fig. 1, the finger 28$^b$ pressing against arm 31 causes shaft 29 to rock. This motion of shaft 29 is transmitted to the rod 19 by a rocker arm 32 fastened on said shaft and connected to the rod. It will be understood that two rods 19 are provided, one for each brake device, and the shaft 29 has two rocker arms 32 one being connected to one rod and the other to the other rod. Only one of the rods 19 needs to be connected to the lever arm 20 because when the hand lever 22 is operated to swing said lever arm, the rod connected to said arm being connected by a rocker arm 32 to shaft 29, said shaft is also rocked, and as it is connected by a second rocker arm to the other rod 19, both rods are operated, and hence both brake devices are operated. The mechanism can therefore be worked from either the front or the rear compartment, the operation of the hand lever 22 not affecting the hand lever 25.

To each brake unit is also connected a brace bar 33. This bar is pivoted at one end to a bracket 34 on the side bar 10, as shown at 35, from which bracket it extends rearwardly to the cam member 12. This cam member is vertically slotted as shown in Fig. 3 to seat the rear end of the brace bar 33, and a pivot bolt 36 passing through the bar and the cam member provides a pivotal connection between said parts. The brace bar 33 projects rearwardly from the cam member 12 for a short distance and to said projecting end is pivoted, as shown at 37, a sprag 38 which is pointed so that it may dig into the ground. The sprag is intended to hold the car on a steep grade.

To the top of the sprag 38 is secured a stout flat spring 39 which extends rearwardly along one side of the cam member 12, and on this side of said member is an eccentric 40 which bears on the free end of the spring. When the cam member 12 is in elevated or inoperative position, as shown in Fig. 2, the eccentric 40 is pointing downward and pressing on spring 39 to hold sprag 38 elevated. To place the sprag in operative, or ground-engaging position, the rod 19 is operated to bring the cam 12 downwardly to within a few inches from the ground. This movement of the cam 12 causes the eccentric 40 to back away from the free end of spring 39, with the result that the sprag 38 is tilted so that its point assumes a position to enter the ground, as clearly shown in Fig. 4.

The two brake units are connected by a transverse brace bar 41 connected at its ends to the pivot bolts 36, and intermediate their ends, said bar carries sleeves 42 through which the rod 18 loosely passes, with set collars 43 carried by said rod and engaging the outer ends of the sleeves. A second brace bar 44 is also provided, the same being connected at its outer ends to the pivots 17ᵇ, and attached intermediate its ends to a sleeve 45 which is loose on rod 18 between the sleeves 42.

To the brace bars 33 are connected coiled springs 46 which are anchored to and depend from the frame side bars 10, said springs being expanded when the brake units are lowered to operative position, and therefore assisting to restore and hold the same in elevated or non-operative position.

The toggle arms or links 14 and 15 are behind the rear axle housing 47 of the car, and the arm 15 has such a curve that it comes beneath said axle housing when the brake is down in operative position. The side of the arm 15 which faces the axle housing 47 has rollers 48 engageable therewith. On the frame side bar 10 is a roller 49 across which the upper end of toggle arm 15 wipes when it swings to place the brake in operative position. When the cam member 12 reaches the ground-engaging position shown in Fig. 1, the curved portion of the arm 15 carrying the roller 48 is pressing upwardly against the axle housing 47 and elevating the same a sufficient distance to take the hind wheels 13 off the ground. The brake mechanism therefore also serves to jack up the rear end of the car. The roller 48 assists the passage of the curved portion of the arm 15 beneath the axle housing, and it is particularly useful when disengaging the brake, giving it an easier movement. The roller 49 engaged by the upper end of the arm 15 serves to guide the same when it moves downwardly and under the axle housing as hereinbefore described, and it also acts as a stop to prevent the arms 14 and 15 from striking the axle housing when the mechanism is in elevated or non-operative position as shown in Figure 2.

I claim:

1. A ground-engaging vehicle brake comprising a pair of toggle members, a transversely extending rod connecting said members and forming the joints thereof, supporting means for one of the members of the toggles, ground-engaging cams rigid on the other members of the toggles, pivotally supported brace bars to which the cam ends of the last-mentioned members are pivotally connected, actuating rods connected to the joints of the toggle members, and brace bars extending between the toggle members, said bars being connected at their ends to said members, and having a pivotal connection intermediate their ends with the first-mentioned rod.

2. A ground-engaging vehicle brake comprising a toggle, supporting means for the toggle, a ground-engaging cam rigid on one of the members of the toggle, actuating means connected to the toggle, a pivotally supported brace bar to which the cam portion of the toggle member is pivotally connected, said bar projecting from the rear of the cam, a sprag pivoted to the rear end of the bar, and cooperating means on the cam and the sprag for placing the latter in ground-entering position.

3. A ground-engaging vehicle brake comprising a toggle, supporting means for the toggle, a ground-engaging cam rigid on one of the members of the toggle, actuating means connected to the toggle, a pivotally supported brace bar to which the cam portion of the toggle member is pivotally connected, said bar projecting from the rear of the cam, a sprag pivoted to the rear end of the bar, a flat spring extending from the sprag, and an eccentric on the cam bearing on the spring.

4. A ground-engaging vehicle brake comprising a toggle, supporting means for the toggle, a ground-engaging cam rigid on one of the toggle members, a vehicle engaging part on the other toggle member operable by an upward movement to jack up the vehicle when the cam engages the ground, and actuating means connected to the toggle.

5. The combination with the frame and the rear axle of a vehicle; of a ground-engaging brake comprising a toggle having one of its members pivotally supported by the vehicle frame, a ground-engaging cam on the other toggle member, and means connected to the toggle for operating the same to bring the cam in contact with the ground, the first-mentioned toggle member having a part which swings upwardly and engages the axle to jack up the vehicle when the toggle is operated as aforementioned.

In testimony whereof I affix my signature.

JOSEPH SCHUBNEL.